United States Patent
Zhao (10) Patent No.: US 9,559,972 B2
(45) Date of Patent: Jan. 31, 2017

(54) SYSTEMS AND METHODS FOR MANAGING CONGESTION

(71) Applicant: COMCAST CABLE COMMUNICATIONS, LLC, Philadelphia, PA (US)

(72) Inventor: Zhen Zhao, Berwyn, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 159 days.

(21) Appl. No.: 14/143,956

(22) Filed: Dec. 30, 2013

(65) Prior Publication Data

US 2015/0188830 A1   Jul. 2, 2015

(51) Int. Cl.
*H04L 12/807* (2013.01)
*H04L 12/801* (2013.01)
*H04L 12/841* (2013.01)

(52) U.S. Cl.
CPC ............. *H04L 47/27* (2013.01); *H04L 47/12* (2013.01); *H04L 47/193* (2013.01); *H04L 47/28* (2013.01); *H04L 47/283* (2013.01)

(58) Field of Classification Search
CPC ........ H04L 47/12; H04L 47/10; H04L 47/193; H04L 47/27; H04L 69/16
USPC ....... 370/229, 230, 231, 232, 234, 235, 236, 370/389; 709/235
See application file for complete search history.

(56) References Cited

U.S. PATENT DOCUMENTS

2009/0073975 A1* 3/2009 Shimonishi .................. 370/389
2009/0154356 A1* 6/2009 Wiemann et al. ............ 370/236
2014/0115186 A1* 4/2014 Weston et al. ................ 709/235

FOREIGN PATENT DOCUMENTS

EP   2890065 A1   7/2015

OTHER PUBLICATIONS

Abouzeid, A.A. et al., Stochastic modeling of TCP Over Lossy Links, InFOCOM 2000, Tel Aviv, Israel.
Ait-Hellal, O. et al., Analysis of TCP Vegas and TCP Reno, Communications, vol. 1, 495-499 (1997).
Allman, M. et al., TCP Congestion Control, RFC5681 (2009).
Bansal, D. et al., "Binomial Congestion Control Algorithms", IEEE INFOCOM 2001.
Casetti, C. et al., "TCP Westwood: End-to-End Bandwidth Estimation for Enhanced Transport over Wireless Links", Wireless Networks, Kluwer Academic Publishers, The Netherlands, vol. 8, pp. 467-479 (2002).

(Continued)

*Primary Examiner* — Jamal Javaid
*Assistant Examiner* — Wali Butt
(74) *Attorney, Agent, or Firm* — Ballard Spahr LLP (57) ABSTRACT

Systems and methods for managing congestion in a network are disclosed. One method can comprise establishing a connection between a first network device and a second network device, wherein the first network device has an associated data limiter value such as a congestion window (CWND). The size of the CWND can be modified, for example, at a first rate, when no congestion is detected. In response to the congestion window size exceeding a threshold value associated with the connection, the size of the CWND can be modified based on round trip time (RTT) associated with the connection. If congestion on the connection is detected, the congestion window size can be modified to a value based on at least in part the bandwidth and RTT of the connection between the first network device and the second network device.

20 Claims, 7 Drawing Sheets

(56) References Cited

OTHER PUBLICATIONS

Floyd, S. et al., Random Early Detection Gateways for Congestion Avoidance, IEEE/ACM Transactions on Networking, vol. 1, No. 4, pp. 397-413 (1993).
Kelly, F., Mathematical Modeling of the Internet, Proceedings of the Fourth International Congress on Industrial and Applied Mathematics, pp. 105-116 (1999).
Lai, K. et al., Measuring Link Bandwidths Using a Deterministic Model of Packet Delay, Proceedings of Sigcomm in ACM Computer Communication Review, pp. 283-294 (2000).
Lai, K., Nettimer: A Tool for Measuring Bottleneck Link Bandwidth, USENIX Symposium on Internet Technologies and Systems (2001).
Li, S.Q. et al., Link Capacity Allocation and Network Control by Filtered Input Rate in High Speed Networks, IEEE/ACM Transactions on Networking, vol. 3, No. 1, pp. 10-25 (1995).
Mascolo, S. et al., TCP Westwood: Bandwidth Estimation for Enhanced Transport Over Wireless Links, Proceedings of the 7th Annual International Conference on Mobile Computing and Networking, Mobicom 2001, vol. conf. 7, 287-297 (2001).
Padhye, J. et al., Modeling TCP Throughput: A Simple Model and its Empirical Validation, Proceedings of Sigcomm in ACM Computer Communication Review, vol. 28, No. 4, pp. 303-314 (1998).
Salim, J. Hadi et al., Performance Evaluation of Explicit Congestion Notification (ECN) in IP Networks, RFC2884 (2000).
European Search Report completed on May 13, 2015 by the European Patent Office for European Patent Application No. 14200393.8, which was filed on Dec. 29, 2014 and published as 2890065 on Jul. 1, 2015 (Inventor-Zhao; Applicant-Comcast Corp.; (6 pages).
2875457 Dec. 19, 2014 Zhao.
14200393.8 Dec. 29, 2014 Zhao.

\* cited by examiner

SYSTEMS AND METHODS FOR MANAGING CONGESTION

BACKGROUND

Networks can experience problems due to network constraints such as congestion. In some congestion avoidance mechanisms, such as transmission control protocol (TCP), network traffic can be controlled using a congestion window. As an example, the congestion window is a sender-side limit on the amount of data the sender can transmit into the network before receiving an acknowledgment (ACK). The size of the congestion window can be adjusted as network conditions change. However, certain reduction in congestion window leads to a low utilization and results in a large variance in queuing delay. This disclosure addresses these and other shortcomings related to managing network congestion.

SUMMARY

It is to be understood that both the following general description and the following detailed description are exemplary and explanatory only and are not restrictive. Methods and systems for managing a network are disclosed.

The methods and systems described herein, in one aspect, can manage congestion in a packet network. In another aspect, methods and systems described herein can adjust a data limiter value as a function of round trip time (RTT) between two network devices. In a further aspect, the data limiter value can be a congestion window (CWND), such as a TCP congestion window or receive window, as a function of round trip time (RTT) between two network devices. As an example, the congestion window can be a sender-side limit on the amount of data the sender can transmit into the network before receiving an acknowledgment (ACK). As a further example, the congestion window can be an advertised window of a receiver, which can operate as a receiver-side limit on the amount of outstanding data on a connection. The congestion window can represent any state variable that can control (e.g., limit) the amount of data (e.g., number of packets) that are transmitted over a network.

Some methods and systems of the present disclosure can use metrics such as bandwidth and RTT determined (e.g., calculated, measured, estimated) between two network devices to set a size of the CWND and/or a slow start threshold, for example, in a, fast recovery and a fast retransmission state of congestion management. In an aspect, the methods and systems can be applied to any congestion control mechanism, such as TCP Tahoe, TCP Reno, TCP new Reno, TCP SACK, TCP VEGAS and the like.

In an aspect, methods can comprise establishing a connection between a first network device and a second network device, wherein the first network device has an associated congestion window (CWND). In a first state (e.g., mode of operation, setting, configuration) of the connection, the size of the CWND can be modified at a non-linear rate when no congestion (e.g., congestion below a threshold or outside a predefined range) is detected. In response to the congestion window size exceeding a threshold value associated with the first state of the connection, the connection can be transitioned to a second state (e.g., mode of operation, condition, configuration). In the second state of the connection, the size of the CWND can be modified based at least in part on round trip time (RTT) associated with the connection. Congestion on the connection can be detected. In response to the detected congestion, the connection can be transitioned to a third state (e.g., mode of operation, condition, configuration). In the third state of the connection, the congestion window size can be modified to a value based on the bandwidth and RTT of the connection between the first network device and the second network device.

In an aspect, methods can comprise establishing a connection between a first network device and a second network device, wherein the first network device has an associated congestion window (CWND). In a first state of the first network device, the size of the CWND can be modified in a non-linear manner. In response to the size of CWND exceeding a threshold value associated with the first state of the first device, the first device can be transitioned to a second state. In the second state of the first network device, the size of the CWND can be modified according to RTT of the connection. If congestion is detected, the first network device can be transitioned to a third state. In the third state, the congestion window size can be modified to a value based on RTT of the connection between the first network device and the second network device.

In an aspect, methods can comprise increasing the size of the CWND based on round trip time (RTT) associated with a connection between a first network device and a second network device in a congestion avoidance state of the connection. Congestion can be detected on the connection. In response to the congestion, the congestion window size can be modified to a value based on the bandwidth and RTT of the connection between the first network device and the second network device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in one aspect, can manage congestion in a packet network. In another aspect, methods and systems described herein can adjust a data limiter value as a function of round trip time (RTT) between two network devices. As an example, the data limiter value can be a sender-side limit on the amount of data the sender can transmit into the network before receiving an acknowledgment (ACK). As a further example, the data limiter value can be an advertised window of a receiver, which can operate as a receiver-side limit on the amount of outstanding data on a connection. The data limiter value can represent any state variable that can control (e.g., limit) the amount of data (e.g., number of packets) that are transmitted over a network. In a further aspect, the data limiter value can be a congestion window (CWND), such as a TCP congestion window or receive window, as a function of round trip time (RTT) between two network devices.

Some methods and systems of the present disclosure can use metrics such as bandwidth and RTT determined (e.g., calculated, measured, estimated) between two network devices to set a size of the data limiter value (e.g., CWND) and/or a slow start threshold, for example, in a fast recovery and a fast retransmission state of congestion management. In an aspect, the methods and systems can be applied to any congestion control mechanism, such as TCP Tahoe, TCP Reno, TCP new Reno, TCP SACK, TCP VEGAS and the like. In another aspect, a central network device can monitor network conditions (e.g., congestion on one or more links) and adjust transmission at one or more network devices based on the network conditions.

In an aspect, methods can comprise establishing a connection between two network devices (e.g., a first network device, a second network device) for sending and receiving data (e.g. data segment, packet, etc.). A congestion window (CWND) can be associated with a sending network device and/or a receiving network device. The size of the CWND can be set to an initial value. The size of the CWND can be increased (e.g., exponentially) when the connection between the two network devices is in a first state. For example, the first state can be a slow start state. In response to the size of the CWND exceeding a threshold associated with the first state, the connection can be transitioned to a second state. For example, the second state can be a congestion avoidance state. In the second state, the size of the CWND can be increased based on RTT of the connection between the first network device and the second network device. When congestion is detected, the connection can be transitioned to a third state. In the third state of the connection, the size of the CWND can be decreased to a value based on the bandwidth and RTT of the connection. In an aspect, the updated threshold associated with the first state can be based on the bandwidth and RTT of the connection. In other words, when the connection is transitioned to (e.g., returned to) the first state from another state (e.g., second state, third state), the updated threshold can be used in the first state.

Figure 1A:
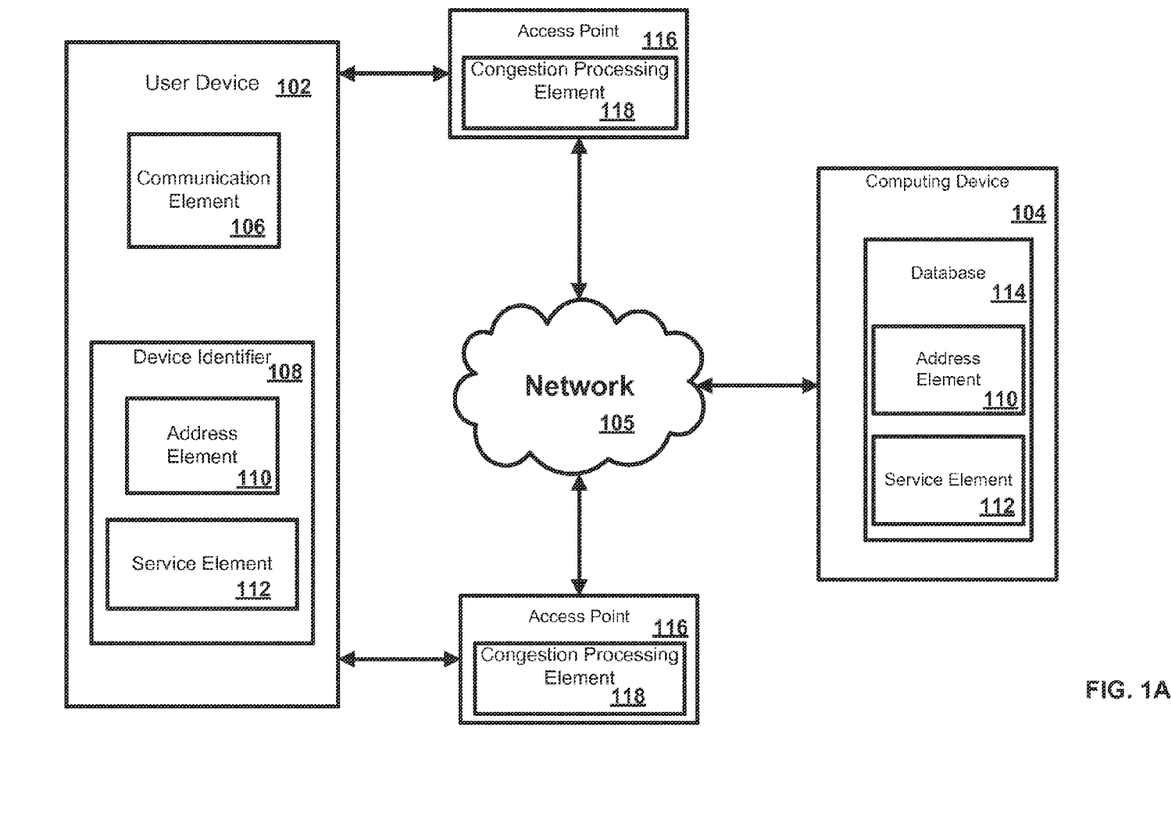
FIG. 1A is a block diagram of an exemplary system and network.

FIG. 1A illustrates various aspects of an exemplary network in which the present methods and systems can operate. The present disclosure is relevant to systems and methods for managing a network, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

The system and network can comprise a user device 102 in communication with a computing device 104 such as a server or network interface device (NID). The computing device 104 can be disposed locally, or remotely, relative to the user device 102. As an example, the user device 102 and the computing device 104 can be in communication via a private and/or public network 105 such as the Internet. Other forms of communications can be used such as wired and wireless telecommunication channels.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback, such as a web browser (e.g., Internet Explorer®, Mozilla Firefox®, Google® Chrome™, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device, such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102.

In an aspect, the service element 112 can comprise an identification of a service provider associated with the user device 102 and/or with the class of user device 102. As an example, the service element 112 can comprise information relating to, or provided by, a communication service provider that is providing or enabling communication services to the user device 102. Services can be data services, such as internet access, financial data transfers, or various file transfer, voice, and/or video services, or a combination thereof. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices, such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources, such as data, devices, and files. As an example, the computing device can be configured as a central location, a headend, or a processing facility, which can receive content (e.g., data, input programming) from multiple sources. The computing device 104 can combine the content from the various sources and can distribute the content to user locations via a distribution system.

In an aspect, the computing device 104 can manage the communication between the user device 102 and a database 114 for sending and receiving data therebetween. As an example, the database 114 can store a plurality of files, webpages, user identifiers or records, or other information. As a further example, the user device 102 can request and/or retrieve a file from the database 114. In an aspect, the database 114 can store information relating to the user device 102, such as the address element 110 and/or the service element 112. As an example, the computing device 104 can obtain the device identifier 108 from the user device 102 and retrieve information from the database 114, such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

Figure 1B:
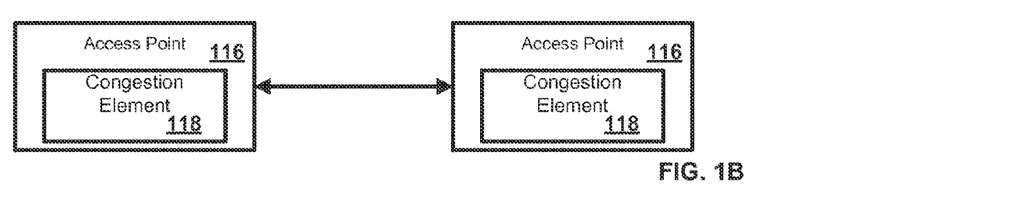
FIG. 1B is a block diagram of an exemplary network.
Figure 1C:
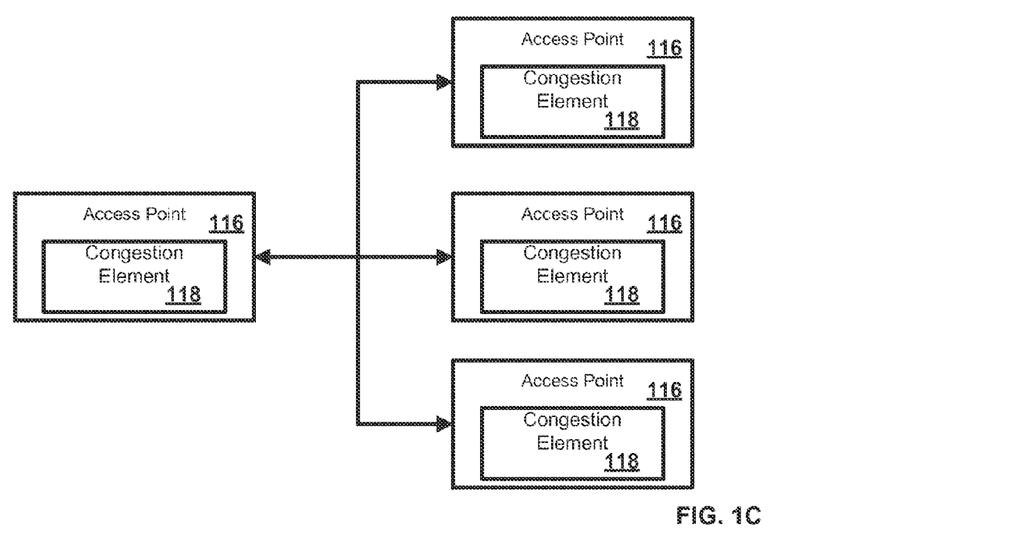
FIG. 1C is a block diagram of an exemplary network.
Figure 1D:
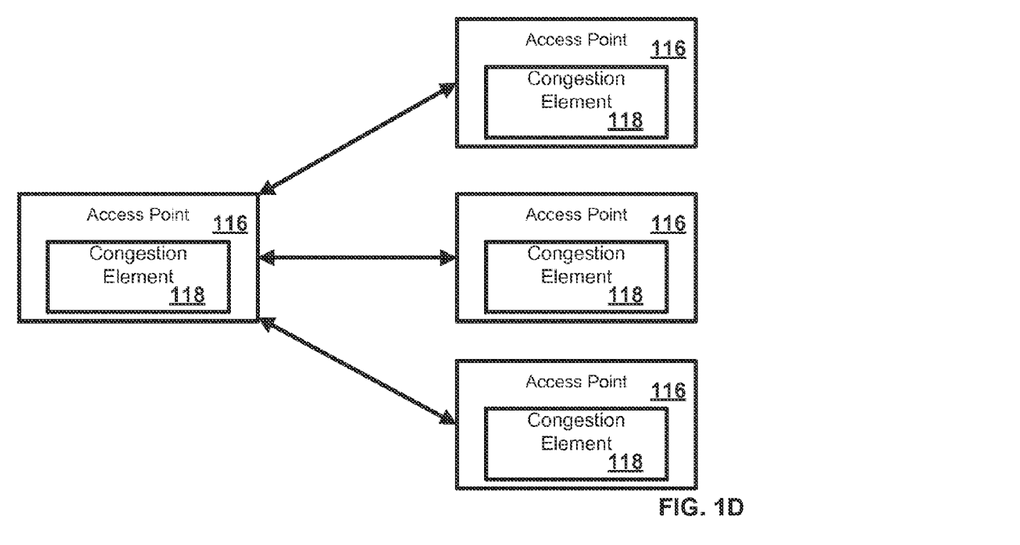
FIG. 1D is a block diagram of an exemplary network.

In an aspect, one or more access points 116 can be in communication with network 105. One or more access points 116 can be a node, a router, a switch, a domain boundary, a network interface, or other communication device. As an example, one or more of the access points 116 can facilitate the connection of a device, such as user device 102, to the network 105. As a further example, one or more of the access points 116 can be configured as a virtual local area network (VLAN) access point. In an aspect, one or more access points 116 can be configured as part of a Carrier Ethernet Network. In another aspect, the access points 116 can be domain boundaries, nodes, and network device elements, for example, and can be configured as a point-to-point configuration (FIG. 1B), a multipoint-to-multipoint configuration (FIG. 1C), and/or a point-to-multipoint configuration (FIG. 1D). Any number of access points 116, such as domain boundaries, nodes, and network elements, can be configured in any configuration. The access points 116 can be configured as endpoints or domain boundaries in the respective configuration.

Returning to FIG. 1A, in an aspect, one or more of the access points 116 can comprise a congestion processing element 118. As an example, the congestion processing element 118 can be configured to receive/transmit data in data packets or Ethernet frames. As a further example, the congestion processing element 118 can be configured to analyze a portion of, or all, the frames or packets to determine congestion information or transmit frames or packets comprising a congestion indicator. For example, when explicit congestion notification (ECN) is used to discover congestion, the acknowledgements (ACKs) for receiving a packet can comprise a mark (e.g., flag, indicator) inserted in ACKs. In an aspect, the congestion processing element 118 can be configured to identify the mark and detect congestion. In another aspect, the congestion processing element 118 can be configured to indicate congestion, for example, by inserting a mark in ACKs for congestion indication and transmitting the ACKs for the received packets. For example, the congestion processing element 118 can comprise a random early detection (RED) element to insert a mark in an ACK. The RED element can monitor the average queue size and can mark packets (e.g., insert indicators in packets) based on statistical probabilities. As an example, if there is no congestion, all incoming packets are accepted. As the congestion window grows, more data is being transmitted into the network. When a data flow exceeds the network (e.g., one of the network links on the path from the source to the destination) capacity, received data that is unable to be outputted (e.g., through a link) can be stored in a buffer. In a simplified network with only one link between the source and destination, the buffer can be disposed on the sender side. As such, the RED element can measure the buffer size. As the buffer size increases, the probability for marking an incoming packet increases. When the network is congested (e.g., the buffer size exceeds a certain level), the probability for marking reaches 1 and all markable packets are marked. As an example, if the packet is experiencing congestion, instead of dropping the packet, a specific bit (e.g., a "CE" bit) in the packet head can be indicated. This act of indicating can be referred to as "marking" and its purpose can be to inform the receiving endpoint of impending congestion. At the receiving endpoint, this congestion indication is handled by a transport layer such as TCP and can be echoed back to the transmitting node in order to signal it to reduce its transmission rate. As a further example, the mark can be a specific code inserted in the header of ACKs understood by the transport protocol (e.g., TCP) and indicating congestion. Other forms of congestion indication can be used. In another aspect, random exponential marking (REM) can be used to indicate congestion. In REM, it may not be necessary to mark packets if the current network input rate is less than the current output rate.

In another aspect, the congestion processing element 118 can be configured to analyze and condition (e.g., modify, format, manipulate, append, fragment, etc.) data packets based on information such as a congestion indication. The congestion processing element 118 can comprise hardware, software, or a combination thereof. In an aspect, the congestion processing element 118 can be configured to determine (e.g., measure, calculate, analyze, etc.) RTT between two network points. For a point-to-point configuration or a point-to-multipoint configuration (such as E-Tree networks), RTT can be determined between two end points (e.g., domain boundaries), such as access points 116 on the network. In an aspect, the network points can be identified by a maintenance end point (MEP), as in carrier Ethernet and multiprotocol label switching (MPLS) networks, by an IP address as in IP networks, by a MAC address as in Ethernet networks, or other identifier. For example, the congestion processing element 118 can use transmission control protocol (TCP) to keep track of when a packet is sent and at what time acknowledgement (ACK) for the sent packet is returned. The congestion processing element 118 can use the information to calculate RTT between two network points (e.g., between the user device 102 and the access point 116). RTT of two network points may vary based on the network traffic patterns changes and availability of access points (e.g., network routers). RTT can be measured using TCP options, whereby the sender places a timestamp in each data segment, and the receiver reflects these timestamps back in ACK segments. Then a single subtract provides the sender an RTT measurement for every ACK segment. RTT can be measured using a sample of only one packet per window.

In an aspect, the congestion processing element 118 can be configured to set and adjust the size of a CWND associated with the access point 116. In an aspect, the congestion processing element 118 can set the size of the CWND to an initial value (e.g., one packet). In an aspect, when the connection is in the first state (e.g., slow start state) of congestion control mechanism, the congestion processing element 118 can increase the size of a congestion window at a non-linear rate (e.g., an exponential rate). When the congestion window exceeds a threshold, the connection can be transitioned to a second state (e.g., congestion avoidance state). For example, the threshold can be an advertised window size associated with the packet receiver. When the threshold is reached or exceeded, the connection can be set to a second state (e.g., congestion avoidance state). When the connection is in the second state (e.g., congestion avoidance state), the congestion processing element 118 can increase the size of a congestion window according to $$cwnd = cwnd + \frac{1}{cwnd} \cdot f(RTT),$$

wherein cwnd is the size of the congestion window, and wherein $f(RTT)=f(RTT)+C \cdot RTT^2$. The initial value of f(RTT) can be set to 1. The element C can be a constant and the constant C can be adjusted based on a specific connection. As an example, C can be set as a maximum possible marking rate (bytes/time unit) such that when a network rate is 100 MBPS and the maximum marking is 10% of all the packets per second, the marking rate is 10 MBPS (or 15 MBPS, for example, accounting for the buffer). As such, the size of the congestion window can be a function of RTT and its rate of increase can be a function of RTT. In an aspect, when congestion is detected in the second state, the connection can be transitioned to a third state (e.g., fast retransmit state, fast recovery state). The congestion processing element 118 can decrease the size of the CWND to a value based on the RTT at the time. Specifically, the size of the CWND can be set according to cwnd=k·Bsteady·RTT, wherein the parameter k can be a constant, and $B_{steady}$ can be the measured steady available bandwidth of the connection between the first network device and the second network device. As an example, considering the current evaluated bandwidth by the current rate (packet size/RTT) as the size of the slow start threshold, k can be set to be 1/packet size.

In an aspect, steady available bandwidth can be measured using one or more of the cprob and abprob methods. In an aspect, the cprob can be implemented to measure available bandwidth by sending a series of packets at a rate higher than a bottleneck rate on the link and then dividing the bytes sent by the time separation between the first and the last packet of the series at the receiver. In another aspect, the Abprob method can comprise using the same probing method as cprob to obtain measurements, but can ignore the possibility of intervening packets in the packet series during transfer.

It should be noted that when a connection between a packet sender (e.g., the user device 102) and a packet receiver (e.g., the access point 116) changes from one state (e.g., slow start state) to another state (e.g., congestion avoidance state), the packet sender (e.g., user device 102) and packet receiver (e.g., access point 116) can be changed from one state (e.g., implementation of slow start protocol) to another state (e.g., implementation of congestion avoidance protocol) accordingly.

Figure 2:
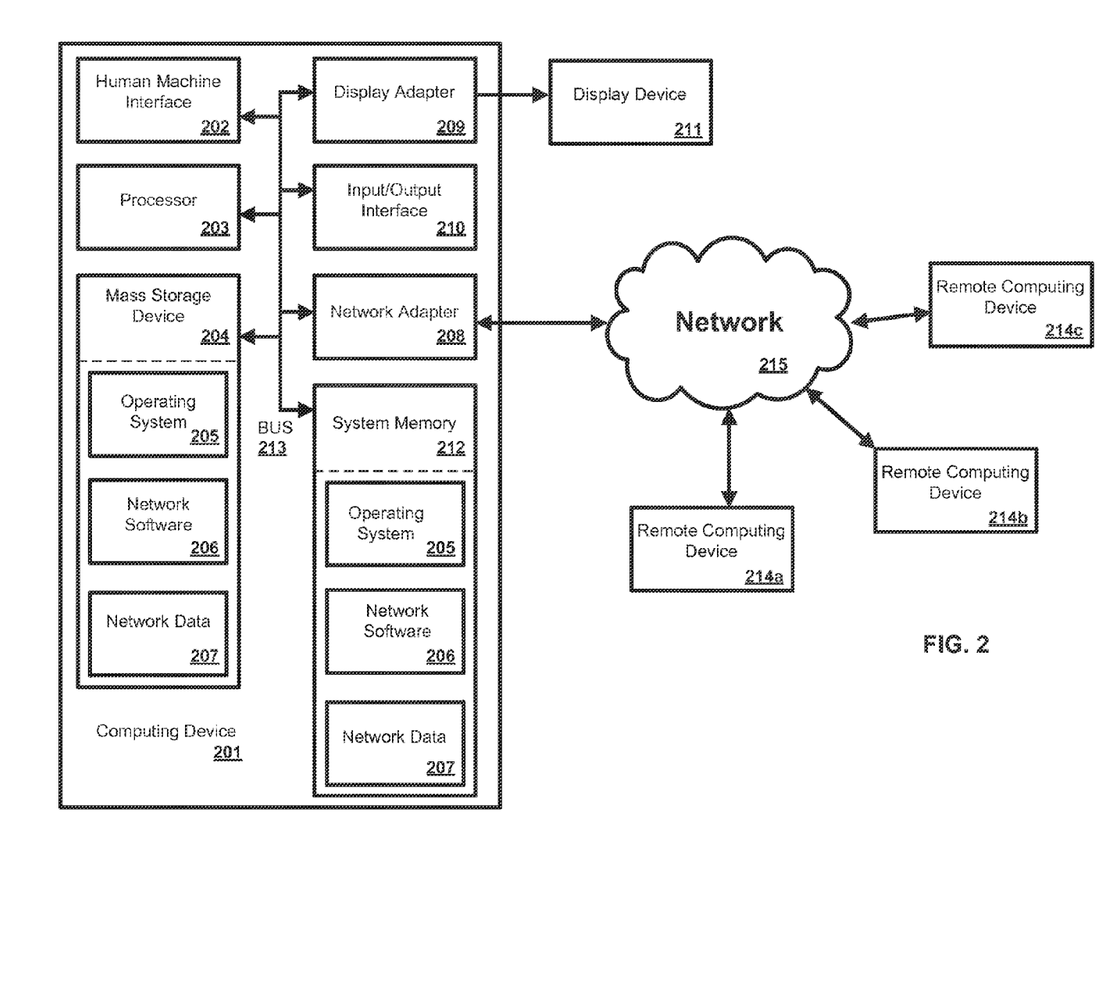
FIG. 2 is a block diagram of an exemplary computing device.

In an exemplary aspect, the methods and systems can be implemented on a computing system, such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. One skilled in the art will appreciate that this is a functional description and that the respective functions can be performed in a system by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data, types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data. 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device, mouse, microphone, joystick, scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
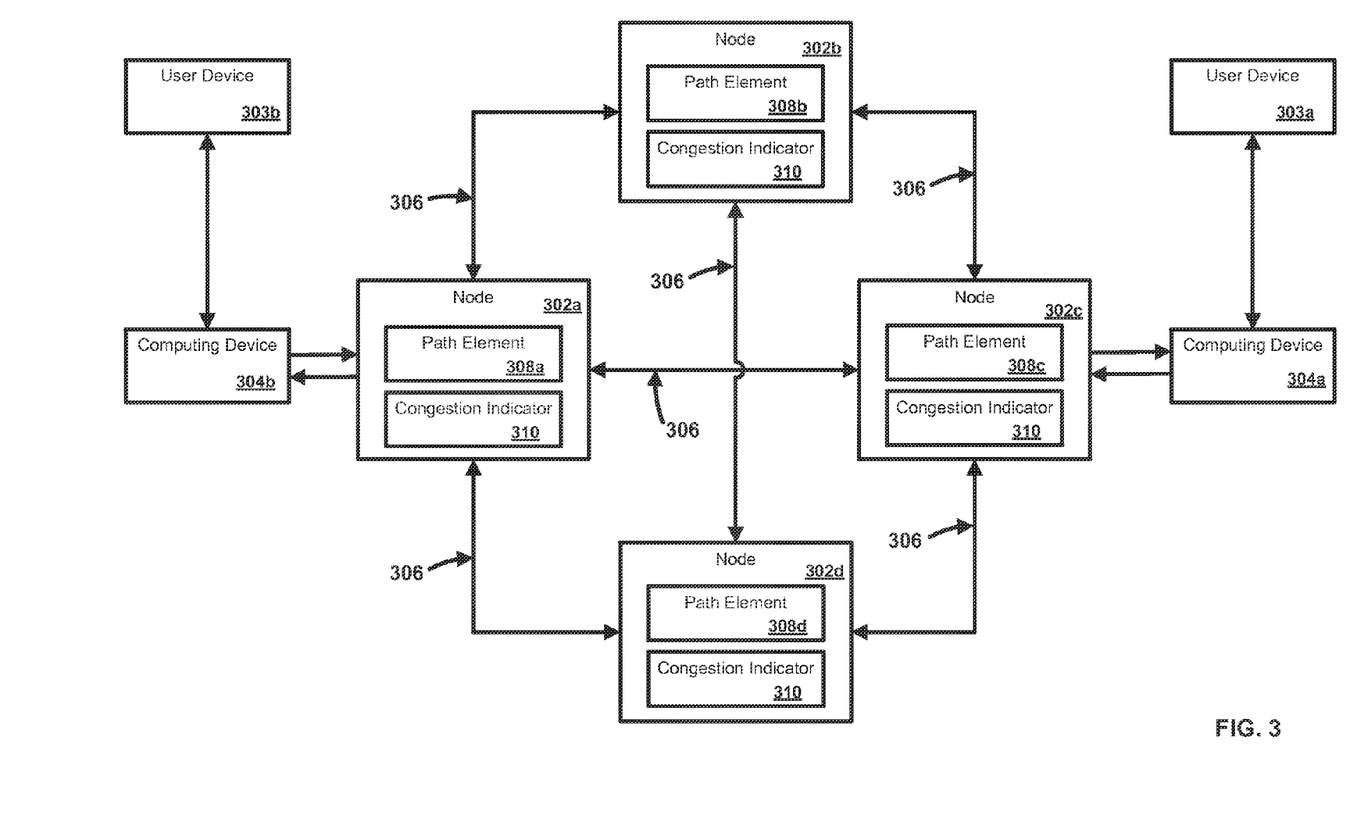
FIG. 3 is a diagram of an exemplary system and network.

FIG. 3 illustrates an exemplary system and network. In an aspect, plurality of nodes 302a, 302b, 302c, 302d can be in communication with one or more user devices 303a, 303b and/or one or more computing devices 304a, 304b. In an aspect, the disclosed systems and methods can be implemented between a network node (e.g., 302a, 302b, 302c, 302d) and a computing device (e.g., 304a, 304b), between two network nodes capable of communicating with each other, between a user device (e.g., 303a) and the computing device (e.g., 304a), between a user device (e.g., 303b) and the computing device (e.g., 304b). One or more of the nodes 302a, 302b, 302c, 302d can be a network access point, a router, a switch, a network interface, or other communication device. As an example, one or more user devices 303a, 303b can be an electronic device, such as a computer, a smartphone, a laptop, a tablet, a set top box, a display device, or other device capable of communicating with one or more of the nodes 302a, 302b, 302c, 302d of the network. As a further example, one or more computing devices 304a, 304b can be a server, a gateway, customer premises equipment (CPE), a network interface device (NID), an optical networking unit (ONU), a headend, a terminal server, a cable modem terminal system, or other network device. As an example, one or more of the nodes 302a, 302b, 302c, 302d can be configured to communicate with at least one of the other of the nodes 302a, 302b, 302c, 302d and/or one or more of the computing devices 304a, 304b via one or more communication paths 306. In an aspect, the one or more communication paths 306 can comprise one or more uninterrupted communication links, sequential links, pre-defined paths or links, and/or intervening nodes. Links can comprise a single point-to-point connection between two devices or access points. Paths can comprise one or more links. As an example, one or more of the communication paths 306 can comprise one or more of the nodes 302a, 302b, 302c, 302d. As a further example, one or more of the nodes 302a, 302b, 302c, 302d can be configured as a mesh network. In an aspect, one or more of the communication paths 306 can be configured to transmit one or more services.

In an aspect, one or more path elements 308a, 308b, 308c, 308d can comprise information relating to one or more of the communication paths 306. One or more path elements 308a, 308b, 308c, 308d can comprise information relating to congestion, path priority, path cost, capacity, bandwidth, signal strength, latency, error rate, path usage, and the like. As an example, the path element 308a, 308b, 308c, 308d can be or comprise the congestion processing element 118 (FIG. 1A). In an aspect, congestion can occur at a boundary node resulting in delay(s) between endpoints, such as between nodes 302a and 302c.

Figure 4:
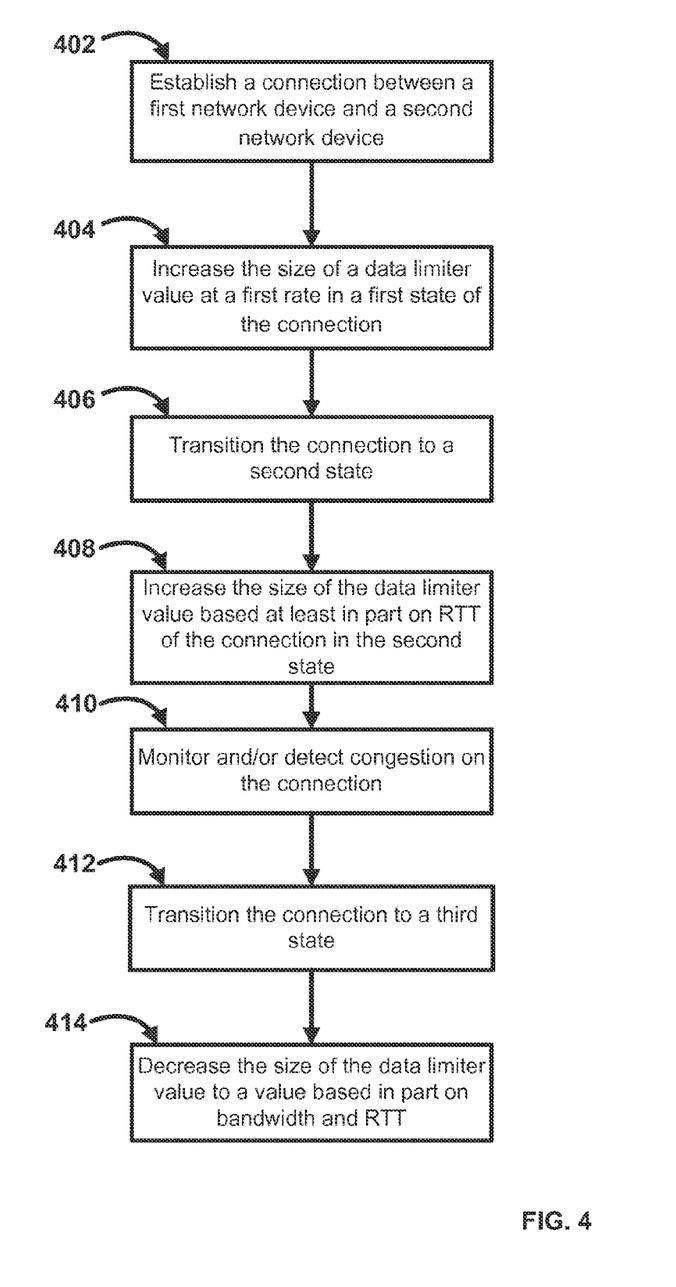
FIG. 4 is a flow chart of an exemplary method for managing congestion.

In an aspect, FIG. 4 illustrates an exemplary method for managing network congestion. At step 402, a connection between a first network device and a second network device can be established. In an aspect of a packet switched network, the connection can use TCP, or a derivation thereof, in the transport layer. In an aspect, the first device can be a packet sender, whereas the second device can be a packet receiver, or vice versa. In an aspect, the first network device can comprise a node, a router, a switch, a domain boundary, a network interface, a server, a gateway, customer premises equipment (CPE), a network interface device (NID), an optical networking unit (ONU), a headend, or other network device such as a computer, a tablet, a smartphone, a PDA, a set top box, and the like. In an aspect, the second network device can comprise a node, a router, a switch, a domain boundary, a network interface, an optical networking unit (ONU), a headend, or other network device such as a computer, a tablet, a smartphone, a PDA, a set top box, and the like. As an example, the first network device can be the user device 102 and the second network device can be the access point 116, as illustrated in FIG. 1A. As another example, the first network device can be an access point 116 and the second network device can be another access point 116 configured as a point-to-point configuration (FIG. 1B), a multipoint-to-multipoint configuration (FIG. 1C), and/or a point-to-multipoint configuration (FIG. ID). As another example, the first network device can be the user device 303a and the second network device can be the computing device 304a, as illustrated in FIG. 3. As another example, the first network device can be the computing device 304a and the second network device can be the node 302c, as illustrated in FIG. 3. In an aspect, the first network device and/or the second network device can have an associated congestion window (CWND). In an aspect, the congestion processing element 118 can set the size of the CWND to an initial value. For example, the initial value of the CWND size can be one or more packets, for example one packet or two packets.

At step 404, in a first state (e.g., mode of operation, setting, configuration) of the connection, the size of the data limiter value (e.g., (CWND) can be increased at a determined rate (e.g., non-linear rate). As an example, the size of the data limiter value can be modified when no congestion is detected (e.g., congestion is below a threshold). In an aspect, the congestion processing element 118 can be configured to adjust the size of a data limiter value associated with the access point 116. For example, the connection can be in a slow start state of a TCP congestion control mechanism, such as TCP Tahoe, TCP Reno, TCP new Reno, TCP SACK, TCP with explicit congestion information, UDP, RSVP, and the like. In an aspect, when no congestion is detected, the size of a data limiter value can be increased at determined rate (e.g., exponential rate). Specifically, when no congestion is detected, the size of the data limiter value can be increases by one packet size for each packet acknowledgement (ACK) transmitted from the packet receiver (e.g., second device) to the packet sender (e.g., first device). For every packet acknowledged, the data limiter value can be modified for every round-trip time (RTT). This can lead to an exponential growth for the size of the data limiter value.

At step 406, in response to the data limiter value exceeding a threshold value associated with the first state of the connection, the connection can be transitioned to a second state (e.g., mode of operation, configuration). As an example, configurations associated with the connection and/or the devices communicating via the connection can be transitioned (e.g., modified). In an aspect, the threshold value can be the size of an advertised window of the packet receiver (e.g., second network device). In an aspect, the threshold associated with the first state can change dynamically. For example, when the connection first starts, the threshold associated with the first state of the connection can be set to the packet receiver's advertised reception/congestion window. When the connection returns to the first state from another state (e.g., a second state, a third state), the threshold associated with the first state can be set to ssthresh=k·$B_{steady}$·RTT, wherein the parameter k can be a constant, and $B_{steady}$ can be the measured steady available bandwidth of the connection between the first network device and the second network device. As an example, considering the current evaluated bandwidth by the current rate (packet size/RTT) as the size of the slow start threshold, k can be set to be 1/packet size.

At step 408, in the second state of the connection, the size of the data limiter value can be increased based at least in part on round trip time (RTT) associated with the connection between the first network device and the second network device. For example, the second state can be a congestion avoidance state of a TCP congestion control mechanism, such as TCP Tahoe, TCP Reno, TCP new Reno, TCP SACK, TCP VEGAS and the like. The second state can be implemented to slow the growth rate of data transmission from the packet sender (e.g., first network device) to the packet receiver (e.g., the second network device). Specifically, the size of the data limiter value can be increased according to $$cwnd = cwnd + \frac{1}{cwnd} \cdot f(RTT),$$

wherein cwnd is the data limiter value and f(RTT)=f(RTT)+ C·$RTT^2$. The initial value of f(RTT) can be set to 1. C can be a constant and the constant C can be adjusted according a specific connection such as maximum marking rate. As such, the size of the data limiter value can be a function of RTT, and the growth rate of data transmission in the second state can be a function of RTT. In an aspect, steps 402-408 can be a, pre-congestion network monitoring routine.

At step 410, congestion on the connection can be monitored and detected. In an aspect, the congestion can be detected when a predefined number of duplicated ACKs are identified. For example, three duplicated ACKs can be used as an indication that a packet has been lost. In another aspect, the congestion can be detected when a mark in an ACK is identified. For example, the mark for congestion indication can be implemented by a random early detection (RED) element of the packet receiver (e.g., second network device) to insert the mark into one or more ACKs. As an example, the mark can be a specific code inserted in the header of ACKs understood by the transport protocol (e.g., TCP), indicating a dropped packet, buffer of the packet receiver (e.g., second network device) reaching its capacity, and the like.

At step 412, in response to detecting the congestion, the connection can be transitioned to a third state (e.g., mode of operation, setting, configuration). As an example, configurations or modes of operation associated with the connection and/or the devices communicating via the connection can be transitioned (e.g., modified). As a further example, the third state can be a fast recovery state of a TCP congestion control mechanism, such as TCP Tahoe, TCP Reno, TCP new Reno, TCP SACK, TCP VEGAS and the like. In the third state of the connection, the size of the data limiter value can be decreased to a value based at least in part on the bandwidth and RTT of the connection between the first network device and the second network device, at step 414. Specifically, the value can be calculated according to cwnd=k·Bsteady·RTT, wherein cwnd represents the data limiter value.

In an aspect, the value can also be used as an updated threshold associated with the first state of the connection. The value can be calculated according to ssthresh=k·$B_{steady}$·RTT, wherein the parameter k can be a constant, and $B_{steady}$ can be the measured steady available bandwidth of the connection between the first network device and the second network device. As an example, considering the current evaluated bandwidth by the current rate (packet size/RTT) as the size of the slow start threshold, k can be set to 1/packet size, As a result, the size of the data limiter value and the updated threshold (e.g., slow start threshold) can be a function (e.g., linear function) of $B_{steady}$ and RTT. When a plurality of connections share bandwidth, the connection with longer RTT can have a greater value of a slow start threshold. As a result, connections with longer RTT and connections with shorter RTT can have a fair share of bandwidth, or any share as determined by a service provider. As an example, a connection with a longer RTT can have a larger one-step increase in data limiter value (e.g., window size) since the rate change of the windows size is relative to RTT. As such, a connection with a longer RTT can implement a larger one-step rate increase as compared to a connection with a shorter RTT. As another example, a connection with a shorter RTT can implement a smaller one-step rate increase as compared to a connection with a longer RTT. Accordingly, a transmission gap between two connections can be reduced to improve the fairness between these two connections in terms of sharing bandwidth.

In the third state, the packet sender (e.g., first network device) can retransmit the lost packets that were indicated by the predefined number of duplicated ACKs, and wait for a new acknowledgment from the packet receiver (e.g., second network device). Once the packet sender receives the new ACK, the ACK can be an indicator that the congestion has been resolved. The connection can be transitioned to the second state (e.g., congestion avoidance state). In an aspect, if a timeout occurs, the connection can be transitioned to the first state (e.g., slow start state). For example, when a retransmission timer expires, the connection can be transitioned to the first state (e.g., slow start state). In the first state, the size of the data limiter value can be set to an initial value (e.g., one packet size), and the threshold associated with the first state can be set according to ssthresh=k·$B_{steady}$·RTT.

Figure 5:
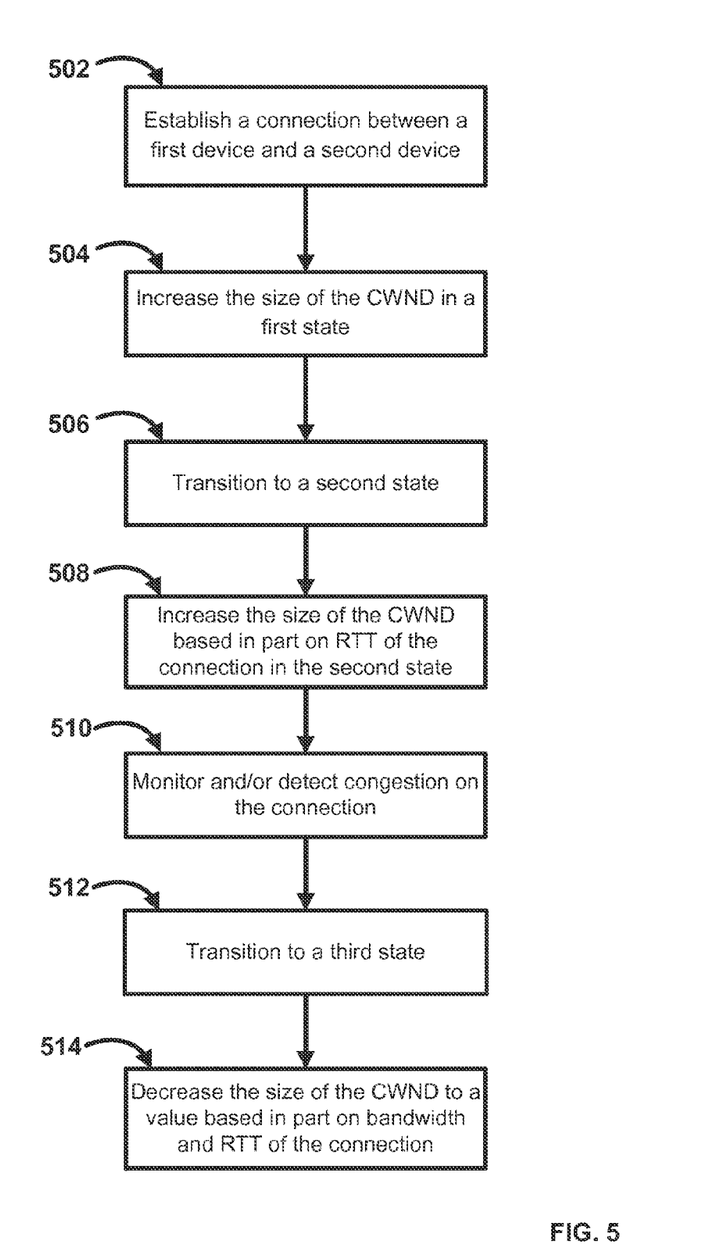
FIG. 5 is a flow chart of an exemplary method for managing congestion.

FIG. 5 illustrates another exemplary method for managing network congestion. At step 502, a connection between a first device (e.g., network device, user device) and a second device (e.g., network device, user device) can be established. In an aspect, the connection can use TCP in the transport layer. In an aspect, the first device can be a packet sender, whereas the second device can be a packet receiver, or vice versa. In an aspect, the first device can comprise a node, a router, a switch, a domain boundary, a network interface, a server, a gateway, customer premises equipment (CPE), a network interface device (NID), an optical networking unit (ONU), a headend, or other device such as a computer, a tablet, a smartphone, a PDA, a set top box, and the like. In an aspect, the second device can comprise a node, a router, a switch, a domain boundary, a network interface, a server, a gateway, customer premises equipment (CPE), a network interface device (NID), an optical networking unit (ONU), a headend, or other device such as a computer, a tablet, a smartphone, a PDA, a set top box, and the like. As an example, the first device can be the user device 102 and the second device can be the access point 116, as illustrated in FIG. 1A. As another example, the first device can be an access point 116 and the second device can be another access point 116 configured as a point-to-point configuration (FIG. 1B), a multipoint-to-multipoint configuration (FIG. 1C), and/or a point-to-multipoint configuration (FIG. ID). As another example, the first device can be the user device 303a and the second device can be the computing device 304a, as illustrated in FIG. 3. As another example, the first device can be the computing device 304a and the second device can be the node 302c, as illustrated in FIG. 3. In an aspect, the first device can have an associated congestion window (CWND). In an aspect, the congestion processing element 118 of the first device can set the congestion window to an initial value. For example, the initial value of the CWND size can be one or more packets, for example one packet or two packets.

At step 504, in a first state of the first device, the size of the CWND can be increased at a first rate (e.g., non-linear rate, exponential rate), when no congestion or congestion under a threshold value is detected. In an aspect, the congestion processing element 118 of the first device can be configured to adjust the size of the CWND associated with the first device. For example, the first state of the first device can be a state where the first device can implement a slow start protocol of a TCP congestion control mechanism, such as TCP Tahoe, TCP Reno, TCP new Reno, TCP SACK, TCP with explicit congestion information, UDP, RSVP, and the like. In an aspect, when no congestion is detected, the size of a the CWND can be increased at exponential rate. In an aspect, the size of the CWND can grow exponentially when the first device is implementing slow start protocol of a TCP congestion control mechanism. Specifically, for every packet acknowledged, the congestion window can increase based on round-trip time (RTT). This can lead to an exponential growth for the size of the CWND.

At step 506, in response to the congestion window size exceeding a threshold value associated with the first state, the first device can be transitioned to a second state. For example, the second state of the first device can be a state where the first device can implement a congestion avoidance protocol of a TCP congestion control mechanism, such as TCP Tahoe, TCP Reno, TCP new Reno, TCP SACK, TCP with explicit congestion information, UDP, RSVP, and the like. In an aspect, the threshold value can be the advertised window for the packet receiver. In an aspect, the threshold can change dynamically. For example, when the connection is first established, the threshold associated with the first state can be set to an advertised window of the packet receiver. When the first device returns to the first state from another state (e.g., a second state, a third state), the threshold associated with the first state can be set to ssthresh=$k \cdot B_{steady} \cdot RTT$, wherein the parameter k can be a constant, and $B_{steady}$ can be the measured steady available bandwidth of the connection between the first device and the second device. As an example, considering the current evaluated bandwidth by the current rate (packet size/RTT) as the size of the slow start threshold, k can be set to be 1/packet size.

At step 508, in the second state of the first device, the size of the CWND can be increased based in part on round trip time (RTT) associated with the connection between the first device and the second device. For example, the second state of the first device can be the state where the first device can implement a congestion avoidance protocol of a TCP congestion control mechanism, such as TCP Tahoe, TCP Reno, TCP new Reno, TCP SACK, TCP VEGAS and the like. The congestion avoidance protocol can be implemented to slow the growth rate of data transmission from the packet sender (e.g., first device) to the packet receiver (e.g., the second device). Specifically, the size of the CWND can be increased according to $$cwnd = cwnd + \frac{1}{cwnd} \cdot f(RTT),$$

wherein cwnd is the size of the congestion window and f(RTT)=f(RTT)+C·RTT². The initial value of f(RTT) can be set to 1. C can be a constant and the constant C can be adjusted based on a specific connection. As such, the size of the congestion window can be a function of RTT, and thereby the growth rate of data transmission in the second state of the first device can be a function of RTT.

At step 510, congestion on the connection can be monitored and/or detected. In an aspect, the congestion can be detected when a predefined number of duplicated ACKs are identified. For example, three duplicated ACKs can be used as an indication that a packet has been lost. In another aspect, the congestion can be detected when a mark in ACK is identified. For example, the mark for congestion indication can be implemented by a random early detection (RED) element of the packet receiver (e.g., second device) to insert the mark to ACKs. As an example, the mark can be a specific code inserted in the header of ACKs understood by the transport protocol (e.g., TCP), indicating dropping a packet, buffer of the packet receiver (e.g., second device) reaching its capacity, and the like.

At step 512, in response to the congestion, the first device can be transmitted to a third state (e.g., fast recovery state). For example, the third state can be the state where the first device can implement a fast recovery protocol of a TCP congestion control mechanism, such as TCP Tahoe, TCP Reno, TCP new Reno, TCP SACK, TCP VEGAS and the like. In the third state of the first device, the size of the CWND can be decreased to a value based at least in part on the bandwidth and RTT of the connection between the first device and the second device, at step 514. Specifically, the value can be calculated according to cwnd=$k \cdot B_{steady} \cdot RTT$.

In an aspect, the value can also be used as an updated threshold associated with the first state of the connection. The value can be calculated according to ssthresh=$k \cdot B_{steady} \cdot RTT$, wherein the parameter k can be a constant, and $B_{steady}$ can be the measured steady available bandwidth of the connection between the first device and the second device. As an example, considering the current evaluated bandwidth by the current rate (packet size/RTT) as the size of the slow start threshold, k can be set to i/packet size.

As a result, the size of the CWND and the updated threshold (e.g., slow start threshold) can be a linear function of $B_{steady}$ and RTT. When a plurality of connections share bandwidth, the connection with longer RTT can have a greater value of slow start threshold. As a result, connections with longer RTT and connections with shorter RTT can have a fair share of bandwidth.

Figure 6:
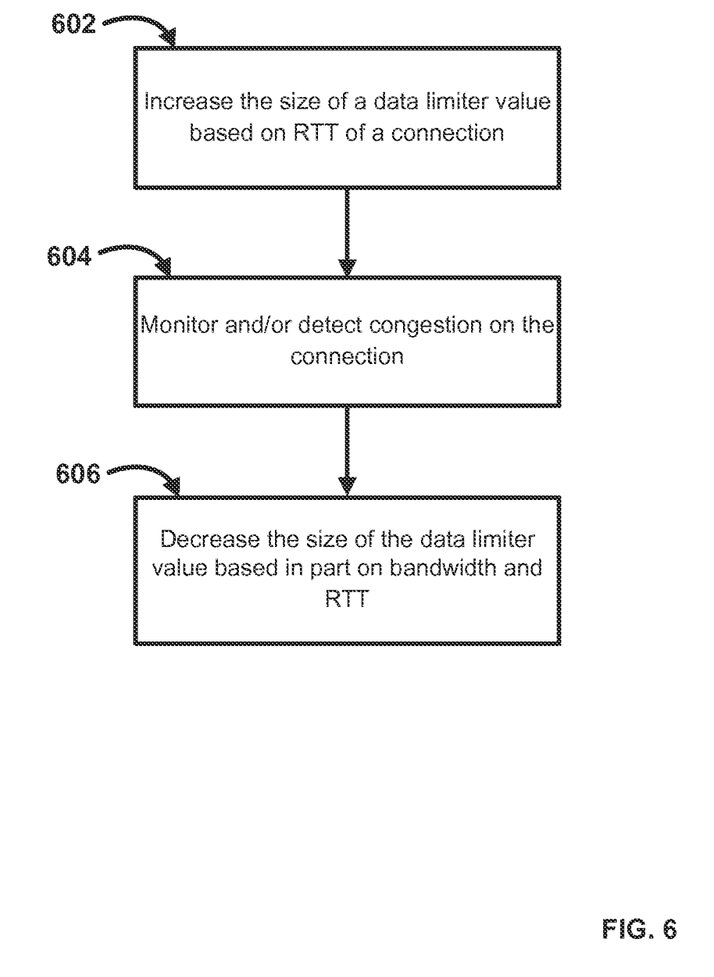
FIG. 6 is a flow chart of an exemplary method for managing congestion.

In the third state, the packet sender (e.g., first device) can retransmit the lost packets that were indicated by the predefined number of duplicated ACKs, and wait for a new acknowledgment from the packet receiver (e.g., second device). Once the packet receives the new ACK, it can be an indicator that the congestion has been resolved. The first device can be returned to the second state (e.g., implementation of congestion avoidance protocol). In an aspect, if a timeout occurs, the first device can be transitioned to the first state (e.g., implementation of slow start state). For example, when a retransmission timer expires, the first device can be transitioned to the first state. In the first state, the size of the CWND can be set to an initial value (e.g., one packet size), and the threshold associated with the first state can be set according to ssthresh=$k \cdot B_{steady} \cdot RTT$ FIG. 6 illustrates an exemplary method for managing network congestion. At step 602, the size of a data limiter value (e.g., CWND) can be increased based at least in part on round trip time (RTT) associated with a connection between a first network device and a second network device. The connection can be in a congestion avoidance state of a congestion control mechanism. In an aspect, the connection between the first network device and the second network device can implement a TCP congestion control mechanism, such as TCP Tahoe, TCP Reno, TCP new Reno, TCP SACK, TCP VEGAS and the like. In an aspect, the first device can be a packet sender, whereas the second device can be a packet receiver, or vice versa. As an example, the first network device can comprise a node, a router, a switch, a domain boundary, a network interface, a server, a gateway, customer premises equipment (CPE), a network interface device (NID), an optical networking unit (ONU), a headend, or other network device such as a computer, a tablet, a smartphone, a PDA, a set top box, and the like. As another example, the second network device can comprise a node, a router, a switch, a domain boundary, a network interface, a server, a gateway, customer premises equipment (CPE), a network interface device (NID), an optical networking unit (ONU), a headend, or other network device such as a computer, a tablet, a smartphone, a PDA, a set top box, and the like. As an example, the first network device can be the user device 102 and the second network device can be the access point 116, as illustrated in FIG. 1A. As an example, the first network device can be an access point 116 and the second network device can be another access point 116 configured as a point-to-point configuration (FIG. 1B), a multipoint-to-multipoint configuration (FIG. IC), and/or a point-to-multipoint configuration (FIG. ID). As another example, the first network device can be the user device 303a and the second network device can be the computing device 304a, as illustrated in FIG. 3. As another example, the first network device can be the computing device 304a and the second network device can be the node 302c, as illustrated in FIG. 3. In an aspect, the first network device can have an associated data limiter value such as a congestion window (CWND).

In an aspect, the congestion processing element 118 can adjust the size of the CWND in a congestion control mechanism. For example, in the congestion avoidance state of a TCP congestion control mechanism (e.g., TCP Tahoe, TCP Reno, TCP new Reno, TCP SACK, TCP VEGAS, etc.), the size of the CWND can be adjusted to control the growth rate of data transmission from the packet sender (e.g., first network device) to the packet receiver (e.g., the second network device) RTT. Specifically, the size of the CWND (e.g., data limiter value) can be increased according to $$cwnd = cwnd + \frac{1}{cwnd} \cdot f(RTT),$$

wherein cwnd is the size of the congestion window and $f(RTT)=f(RTT)+C \cdot RTT^2$. The initial value of f(RTT) can be set to 1. C can be a constant and the constant C can be adjusted according a specific connection. As such, the growth rate of data transmission in the congestion avoidance state of a congestion control mechanism can be a function of RTT.

At step 604, congestion on the connection between the first network device and the second network device can be monitored and/or detected. In an aspect, the congestion can be detected when a predefined number of duplicated ACKs are identified. For example, three duplicated ACKs can be used as an indication that a packet has been lost. In another aspect, the congestion can be detected when a mark in ACK is identified. For example, the mark for congestion indication can be implemented by a random early detection (RED) element of the packet receiver (e.g., second network device) to insert the mark into ACKs. As an example, the mark can be a specific code inserted in the header of ACKs understood by the transport protocol (e.g., TCP), indicating a dropped packet, buffer of the packet receiver (e.g., second network device) reaching its capacity, and the like.

At step 606, in response to the congestion, the size of the data limiter value can be decreased to a value based on the bandwidth and RTT of the connection between the first network device and the second network device. Specifically, the value can be calculated according to $cwnd=k*B_{steady}*RTT$ wherein cwnd represents the data limiter value, the parameter k can be a constant, and $B_{steady}$ can be the measured steady available bandwidth of the connection between the first network device and the second network device. As an example, considering the current evaluated bandwidth by the current rate (packet size/RTT) as the size of the slow start threshold, k can be set to 1/packet size. As such, the size of the data limiter value and the updated threshold (e.g., slow start threshold) can be a function (e.g., linear function) of $B_{steady}$ and RTT. When a plurality of connections share a bandwidth, the connection with longer RTT can have a greater value than the slow start threshold. As a result, connections with longer RTT and connections with shorter RTT can have a fair share of bandwidth.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   establishing a connection between a first network device and a second network device, wherein the first network device has an associated congestion window (CWND), wherein the CWND is a limit on an amount of data the first network device can transmit via the connection before receiving an acknowledgment from the second network device;
   increasing a size of the CWND at a first rate when no congestion is detected on the connection;
   in response to the size of the CWND exceeding a threshold value, increasing the size of the CWND at a second rate based at least in part on a function of a round trip time (RTT) associated with the connection, wherein the function comprises the RTT raised to a power of at least two;
   detecting congestion on the connection by identifying a predefined number of duplicate acknowledgments; and
   decreasing the size of the CWND to a value based at least in part on a bandwidth and the RTT of the connection.

2. The method of claim 1, wherein the establishing the connection between the first network device and the second network device comprises setting the size of CWND to an initial value of 1.

3. The method of claim 1, wherein the size of the CWND is increased at the second rate based on $$cwnd = cwnd + \frac{1}{cwnd} \cdot f(RTT),$$

and wherein $f(RTT)=f(RTT)+C \cdot RTT^2$, and wherein f(RTT) is a function of RTT and C is a constant.

4. The method of claim 1, wherein the decreasing the size of the CWND to the value is based on cwnd=k·$B_{steady}$·RTT, and wherein $B_{steady}$ is a measured steady available bandwidth of the connection and k is a constant.

5. The method of claim 1, further comprising setting the threshold value to ssthresh=k·$B_{steady}$·RTT, and wherein $B_{steady}$ is a measured steady available bandwidth of the connection and k is a constant.

6. A method comprising:
monitoring a connection between a first network device and a second network device, wherein the first network device has an associated congestion window (CWND), wherein the CWND is a limit on an amount of data the first network device can transmit via the connection before receiving an acknowledgment from the second network device;
in a first state of the first network device, increasing a size of the CWND at a first rate when no congestion is detected;
in response to the size of the CWND exceeding a threshold value associated with the first state of the first network device, transitioning the first network device to a second state;
in the second state of the first network device, increasing the size of the CWND at a second rate at least in part in view of a function of a round trip time (RTT) of the connection, wherein the function comprises the RTT raised to a power of at least two;
when congestion is detected by identifying a predefined number of duplicate acknowledgments or by identifying a mark in one or more acknowledgments, transitioning the first network device to a third state; and
in the third state, decreasing the size of the CWND to a value based at least in part on the RTT of the connection.

7. The method of claim 6, wherein, in the second state, the size of the CWND is increased based on $$cwnd = cwnd + \frac{1}{cwnd} \cdot f(RTT),$$

and wherein f(RTT)=f(RTT)+C·RTT², and wherein f(RTT) is a function of RTT and C is a constant.

8. The method of claim 6, wherein in the third state, the size of CWND is set to a value based on cwnd=k·$B_{steady}$·RTT, and wherein $B_{steady}$ is a measured steady available bandwidth of the connection and k is a constant.

9. The method of claim 6, further comprising in the third state, setting the threshold value associated with the first state to ssthresh=k·$B_{steady}$·RTT, and wherein $B_{steady}$ is a measured steady available bandwidth of the connection and k is a constant.

10. The method of claim 6, wherein the first state of the first network device is a state of implementing a slow start protocol of a transmission control protocol (TCP) congestion control mechanism, the second state of the first network device is a state of implementing a congestion avoidance protocol of a TCP congestion control mechanism, and the third state of the first network device is a state of implementing a fast retransmission protocol of a TCP congestion control mechanism.

11. The method of claim 1, wherein the function comprises a prior value of the function added to a product of a first value and a second value, wherein the first value comprises a constant and the second value comprises the RTT raised to the power.

12. The method of claim 11, wherein the constant is adjusted based on the connection.

13. The method of claim 12, wherein the constant is based on a marking rate of the connection.

14. The method of claim 1, wherein the power is two.

15. A method comprising:
monitoring a connection between a first network device and a second network device, wherein the first network device has an associated congestion window (CWND), wherein the CWND is a limit on an amount of data the first network device can transmit via the connection before receiving an acknowledgment from the second network device;
increasing a size of the CWND at a first rate when no congestion is detected on the connection;
in response to the size of the CWND exceeding a threshold value, increasing the size of the CWND at a second rate based at least in part on a function of a round trip time (RTT) associated with the connection, wherein the function comprises the RTT raised to a power of at least two;
detecting congestion on the connection by identifying a mark in one or more acknowledgments; and
decreasing the size of the CWND to a value based at least in part on a bandwidth and the RTT of the connection.

16. The method of claim 15, wherein the mark comprises an indicator of congestion inserted into the one or more acknowledgments.

17. The method of claim 6, wherein the mark comprises an indicator of congestion inserted into the one or more acknowledgments.

18. The method of claim 6, wherein the first state comprises a first operational mode for transmitting data and the second state comprises a second operational mode for transmitting data, and wherein the second operational mode is different from the first operational mode.

19. The method of claim 1, wherein the predefined number of duplicate acknowledgments comprises at least three duplicate acknowledgments.

20. The method of claim 6, wherein the power is two.

* * * * *